United States Patent [19]

Poe

[11] Patent Number: 4,828,299

[45] Date of Patent: May 9, 1989

[54] LATCH

[75] Inventor: L. Richard Poe, Long Beach, Calif.

[73] Assignee: Hartwell Corporation, Placentia, Calif.

[21] Appl. No.: 33,405

[22] Filed: Mar. 31, 1987

[51] Int. Cl.⁴ .............................................. E05C 1/14
[52] U.S. Cl. ............................ 292/139; 292/DIG. 31; 292/341.15; 292/DIG. 49
[58] Field of Search ................. 292/DIG. 4, DIG. 49, 292/167, 139, 181, 341-315, DIG. 31

[56] References Cited

U.S. PATENT DOCUMENTS

| | | | |
|---|---|---|---|
| 1,118,768 | 11/1914 | Hebgeson | 292/139 |
| 1,475,725 | 11/1923 | Steinmark | 292/169 |
| 1,747,092 | 2/1930 | Van Note | 292/DIG. 72 X |
| 1,839,406 | 1/1932 | McLaughlin | 292/150 |
| 2,447,190 | 8/1948 | Lickteig | 292/169.13 |
| 2,576,635 | 11/1951 | Nottingham | 292/99 |
| 2,644,706 | 7/1953 | McConnell | 292/150 |
| 2,721,750 | 10/1955 | Rudis | 292/139 |
| 2,721,751 | 10/1955 | Holritz | 292/169 |
| 2,978,266 | 8/1958 | Poe | 292/57 |
| 3,341,239 | 9/1967 | Wheeler | 292/139 |
| 3,699,788 | 10/1972 | Gerlach et al. | 292/139 X |
| 3,912,309 | 10/1979 | Fischer et al. | 292/167 |
| 4,179,143 | 12/1979 | Shy | 292/150 |
| 4,312,204 | 1/1982 | Davis | 292/167 |
| 4,318,557 | 3/1982 | Bourne et al. | 292/113 |
| 4,379,577 | 4/1983 | Robertson | 292/341.15 |

OTHER PUBLICATIONS

Sales Drawing "Latch-Tension Sheer Positive Lock No. 9081" of Avibank Manufacturing Inc. (8/9/72).

Primary Examiner—Richard E. Moore
Attorney, Agent, or Firm—Lyon & Lyon

[57] ABSTRACT

Latch mechanisms for latching two bodies in both tension and shear. A longitudinally extending latching bolt is associated with a latching assembly having an over-center link mechanism controlled by a lever. The over-center link mechanism includes a slot cooperating with a pin to provide two effective lengths to the fully extended linkage. A laterally extending notch provides a shoulder intermediate the ends of the slot to receive the pin. A keeper is slidably associated with a keeper assembly to engage the longitudinally extending bolt to prevent its withdrawal from the keeper assembly. Inclined surfaces between the latching bolt and the keeper function to engage or disengage the spring biased keeper with movement of the latching bolt in a preselected direction.

17 Claims, 7 Drawing Sheets

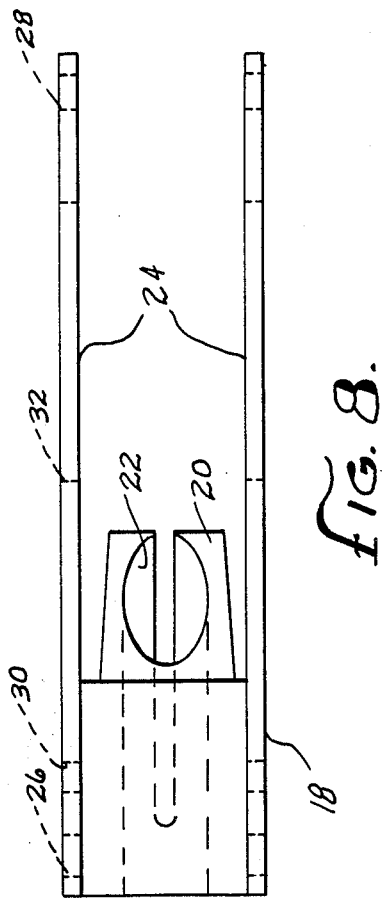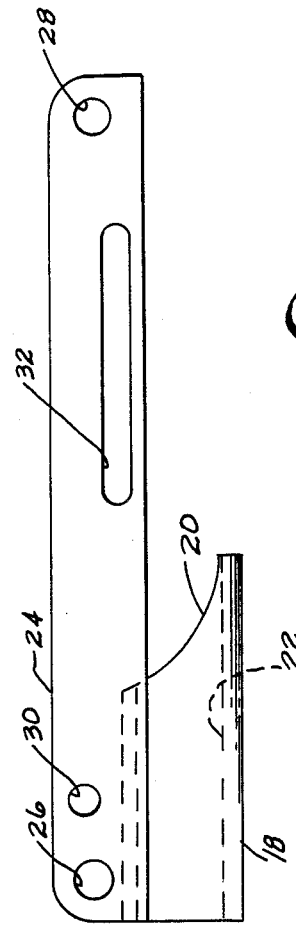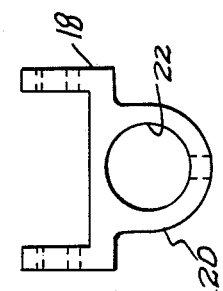

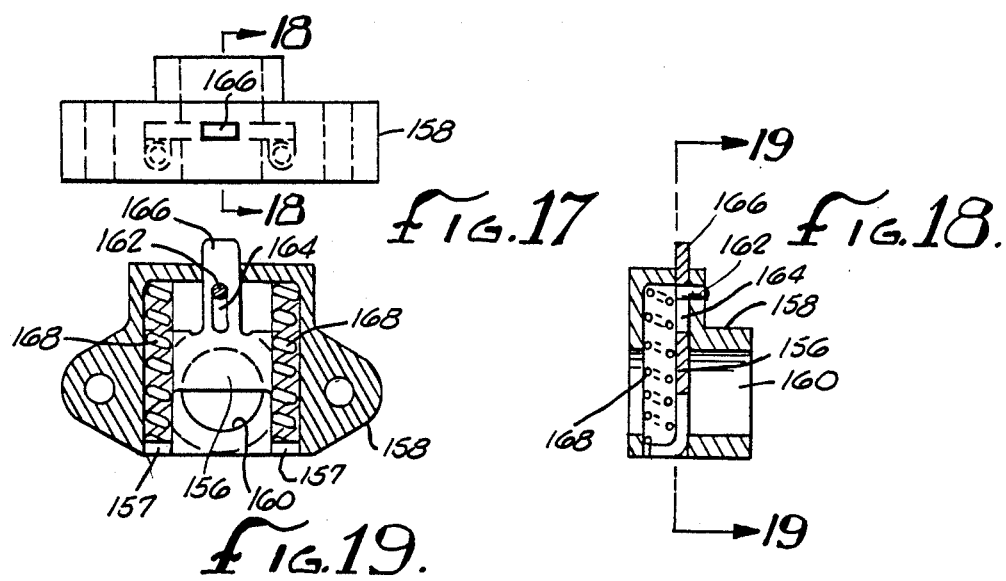

LATCH

BACKGROUND OF THE INVENTION

The field of the present invention is mechanisms for latching two bodies.

Latch mechanisms have generally been developed which either provide tension capabilities or shear capabilities. Latching devices exhibiting shear latching capabilities include deadbolt locks and the like which employ a longitudinally extending bolt associated with a first body and a bore or mortise associated with a second body to be latched to the first. The bolt moves longitudinally into the bore to then resist shearing movement perpendicular to the longitudinal direction of the bolt.

Tensioning latches typically incorporate a hook cooperating with a keeper, bar, shoulder or pin. A lever may be arranged cooperating with the hook to advance the hook beyond the keeper and retract the hook into tensioned engagement with the keeper. Overcenter linkage mechanisms may be employed to retain the lever with the hook in the tension condition. One such tension latch is illustrated in Bourne et al., U.S. Pat. No. 4,318,557.

Latching devices have been developed which provide both tensioning and shear capabilities in latching two adjacent bodies together. One such device is illustrated in Poe, U.S. Pat. No. 2,978,266. A complicated mechanical mechanism is employed to insert and retract a longitudinally extending latching bolt and rotate the latching bolt when arranged with a keeper such that the shank of the bolt resists shear and a head on the bolt provides an interlocking shoulder for supporting tension between the latch body and the keeper body.

SUMMARY OF THE INVENTION

The present invention is directed to a latching mechanism operating in both tension and shear to latch two bodies together. To this end, a latch assembly is associated with one of the bodies and includes a longitudinally extendable latching bolt. A keeper assembly is associated with the second body to receive the latching bolt.

In a first aspect of the present invention, two links are employed between the body of the latch assembly and the latching bolt to form, with the latch body and latching bolt, a linkage mechanism for actuation of the latching bolt. Associated with the linkage mechanism is a slot having a lateral notch intermediate its ends. This slot may be associated with one of the link pins, in a link, the body or bolt. An operator of the latch may thus be afforded a selection of linkage modes advantageous for retracting the bolt from the keeper or applying a tension force to the bolt with the keeper engaged.

In a second aspect of the present invention, a latch assembly with a longitudinally extending latching bolt is again employed with a keeper assembly. The latching bolt includes a locking surface arranged at a substantial angle to the longitudinal direction of the bolt. The keeper assembly may include a keeper which interlocks with the locking surface in order that tension might be applied to the bolt and in turn to the joint between the first and second bodies.

The latch assemblies of the present invention find particular utility in flush-mounted configurations most useful for aircraft panels and the like. Certain aspects of the preferred embodiments allow for adjustment of the tension under load, indications of when the mechanism is not fully locked and a convenient lever mechanism for actuating the linkage mechanism.

Accordingly, it is an object of the present invention to provide an improved latch mechanism. Other and further objects and advantages will appear hereinafter.

BRIEF DESCRIPTION OF THE DRAWINGS

In the drawings, similar reference characters denote similar elements throughout the several views.

FIG. 6 is a side elevation of the latch body of the device of FIG. 1.

FIG. 7 is an end view of the device of FIG. 6.

FIG. 8 is a plan view of the device of FIG. 6.

FIG. 17 is a top view of the keeper assembly illustrated in the device of FIG. 13.

FIG. 18 is a cross-sectional side view of the keeper of FIG. 17 taken along line 18—18 of FIG. 17.

FIG. 19 is a cross-sectional end view taken along line 19—19 of FIG. 18.

DETAILED DESCRIPTION OF THE PREFERRED EMBODIMENTS

Figure 1:
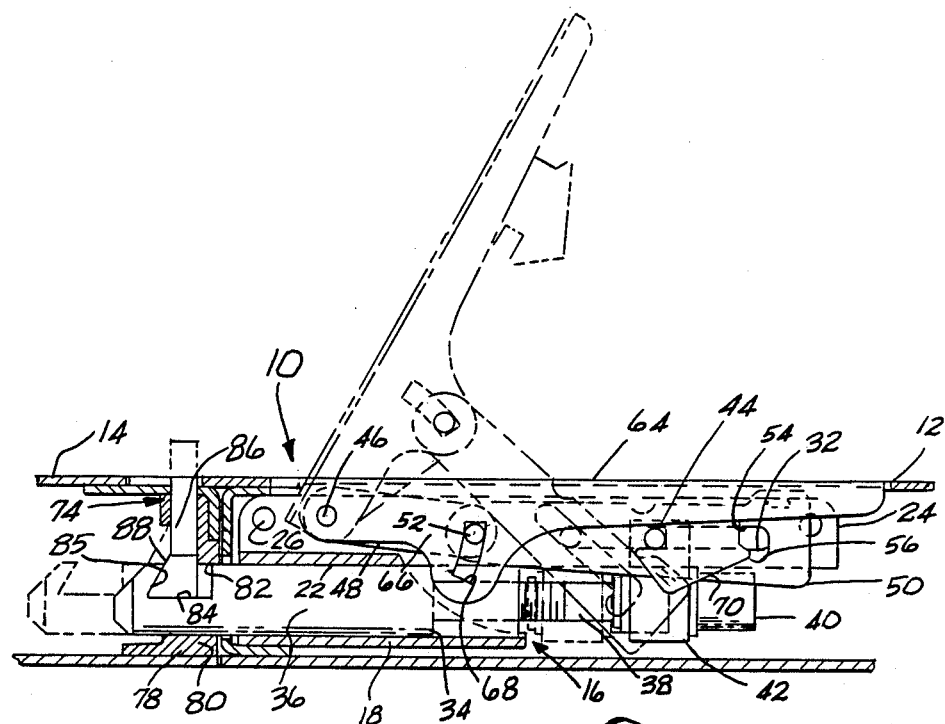
FIG. 1 is a cross-sectional side view of a latch mechanism of the present invention illustrating in full line the latched condition and in the process of locking in phantom line.

Turning to the embodiment of FIGS. 1 through 8, a latch mechanism, generally designated 10 is illustrated in association with a first body 12 and a second body 14 arranged to be held together by the mechanism 10. Associated with the first body 12 is a latch assembly, generally designated 16, including a latch body 18 fixed to the first body 12. The latch body 18 is shown separately in FIGS. 6, 7 and 8. The body 18 includes a barrel 20 defining a central bore 22. The barrel 20 depends from and extends parallel to two side plates 24. The side plates 24 include holes 26 and 28 at the front and rear ends of the side plates, respectively, for receiving fasteners. The fasteners extend to the first body 12 to retain the latch body 18 and in turn the entire latch assembly 16 in place on the first body 12. Also extending through each of the plates 24 are holes 30 to receive a mounting pin further described below. Guide slots 32 extend longitudinally along a portion of the side plates 24.

The latch assembly 16 further includes a latching bolt 34. The latching bolt 34 is slidably mounted in the central bore 22 to extend longitudinally through the central bore 22 for latching operation. The latching bolt 34 includes a bolt head 36 having an internal bore to receive an adjusting shaft 38 threaded at one end. The shaft 38 extends rearwardly to a head 40 which incorporates some means for permitting rotation of the adjusting shaft 38 to adjust the length of the overall latching bolt 34. A conventional tool such as an Allen wrench may be employed with a hexagonal hole formed in the end of the head 40. A trunnion 42 is positioned on the adjusting shaft 38 and retained from sliding longitudinally thereon. The trunnion 42 extends upwardly above the latching bolt 34 to receive a pin 44. The pin 44 extends laterally through the trunnion 42 and into the guide slots 32 in the side plates 24. Adjustment to the adjusting shaft 38 by rotation thereof into and out of the bolt head 36 acts to vary the longitudinal dimension of the bolt between its head and the pin 44.

Figure 2:
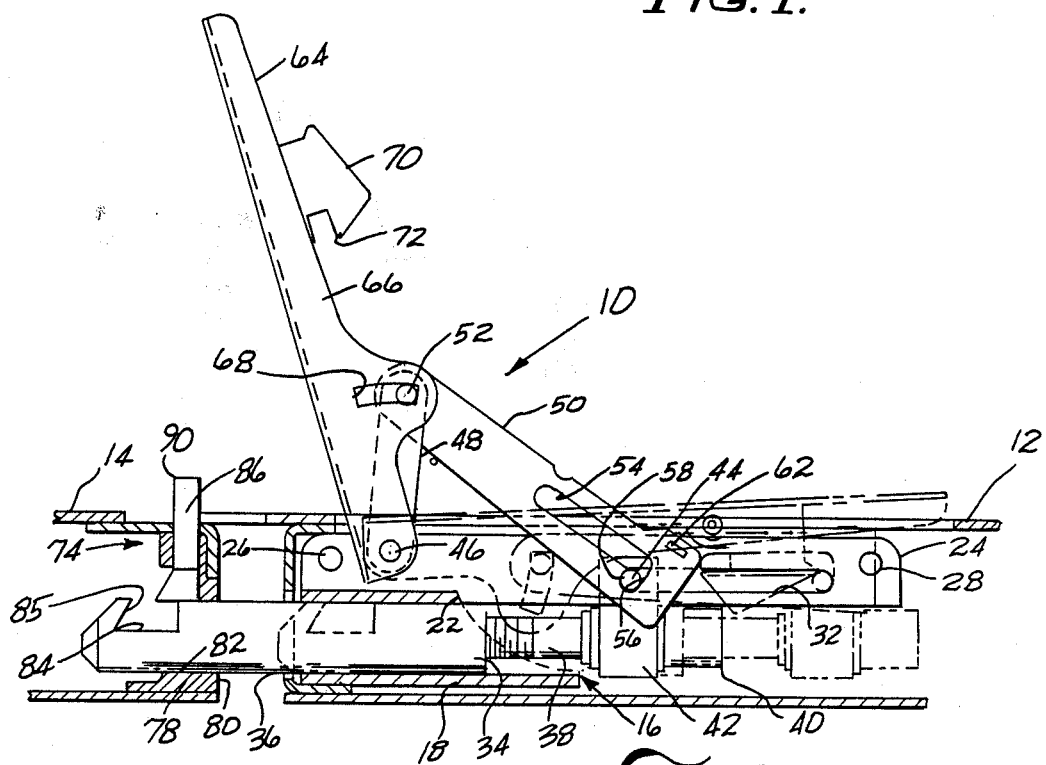
FIG. 2 is a cross-sectional side view of the latch mechanism of FIG. 1 illustrating the assembly in prepration for full retraction of the latching bolt and with the bolt fully retracted in phantom.
Figure 3:
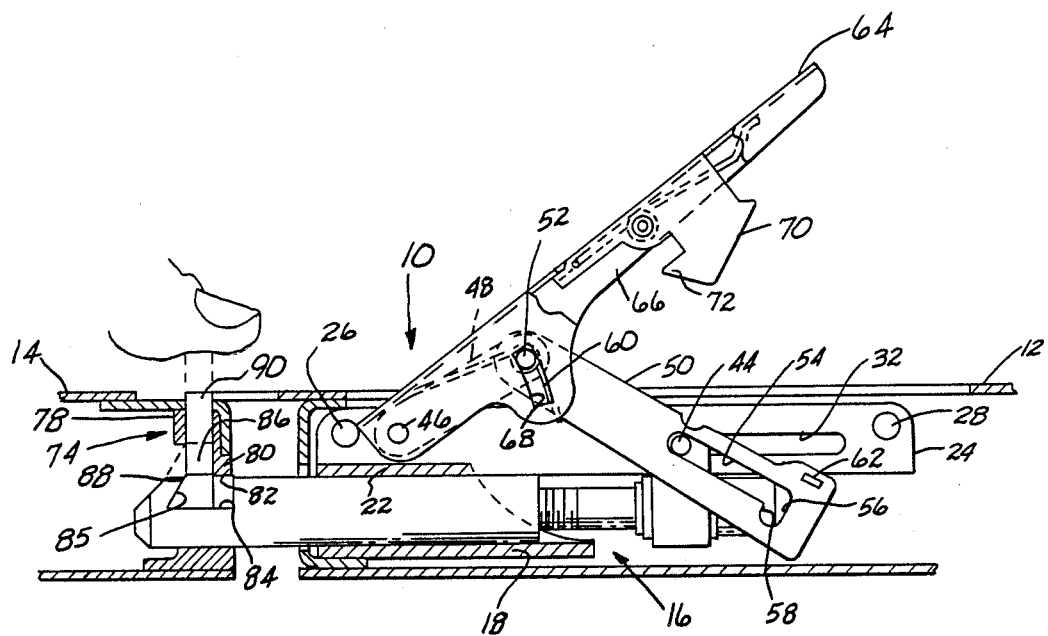
FIG. 3 is a cross-sectional side view of the latching mechanism of FIG. 1 illustrating the keeper in the locking position in full line and in the retracted position in phantom.

Extending through the holes 30 is another pin 46. The pin 46 is thus retained relative to the latch body 18. By comparison, the pin 44 and the latching bolt 34 associated therewith is able to move longitudinally in the slots 32. In this embodiment, linkage is provided which includes the two pins 44 and 46 to control and forcefully actuate the latching bolt 34 relative to the latch body 18. The linkage also includes a first link 48 defined by two link plates. The link plates of the link 48 are pivotally mounted about the pin 46 at one end thereof. A second link 50 defined by two link plates extends from a coupling with the pin 44. The link plates of the link 48 and the link plates of the link 50 are pinned together at one end of each by another pin 52. Thus linkage is provided between the latch body 18 through the pin 46, the link 48, the pin 52, the link 50 and the pin 44. The coupling between the pin 44 and the link 50 is accomplished by means of slots 54 located in each of the link plates of the second link 50. The slots 54 are of sufficient width to receive the pin 44 for sliding therealong. The slots 54 also include laterally extending notches 56 at one end thereof. The notches are also wide enough to receive the pin 44 and define a shoulder 58 intermediate the ends thereof against which the pin 44 may rest. A torsion spring 60 (illustrated in FIG. 3) coiled about the pin 46 with ends extending to bias the link 50 in a counterclockwise direction, as seen in FIG. 3, is employed such that the link 50 will move upwardly when the pin 44 reaches the lateral notch 56. This occurs at the orientation of the linkage as seen in FIG. 2. A bridge 62 extends between the link plates of the link 50 and forms a spot upon which one may physically overcome the spring 60 by pushing on the link itself. The links pivot relative to one another and are provided with sufficient clearance such that the links are able to swing overcenter to act as an overcenter lock mechanism.

To control the linkage, a lever 64 is provided. The lever 64 operates as a handle and includes a pair of side flanges 66 which extend downwardly to a pivotal mounting on the pin 46. The side flanges 66 are located outwardly of the links 48. The side flanges 66 also extend to and are coupled with the pin 52. The pin 52 is positioned within slots 68 in the side flanges 66. The slots 68 are arranged in an arc about the axis of the pin 46 such that the links 48 rather than the side flanges 66 accommodate the compression loads imposed on the overcenter link mechanism. The slots 68 are designed to provide some travel such that the lever 64 may be raised without having the linkage proceed overcenter. In this way, adjustments can be made to the adjusting shaft 38 while the latch remains in tensioned engagement. To retain the lever in the closed and locked position, a pivotal locking member 70 having a hook 72 is arranged to engage the pin 44 when the latching bolt 34 is in the locked position. The locking member 70 is pivotally mounted to the lever 64 with a latch release located in the center of the lever to be accessible from outside of the first body.

Figures 4, 5:
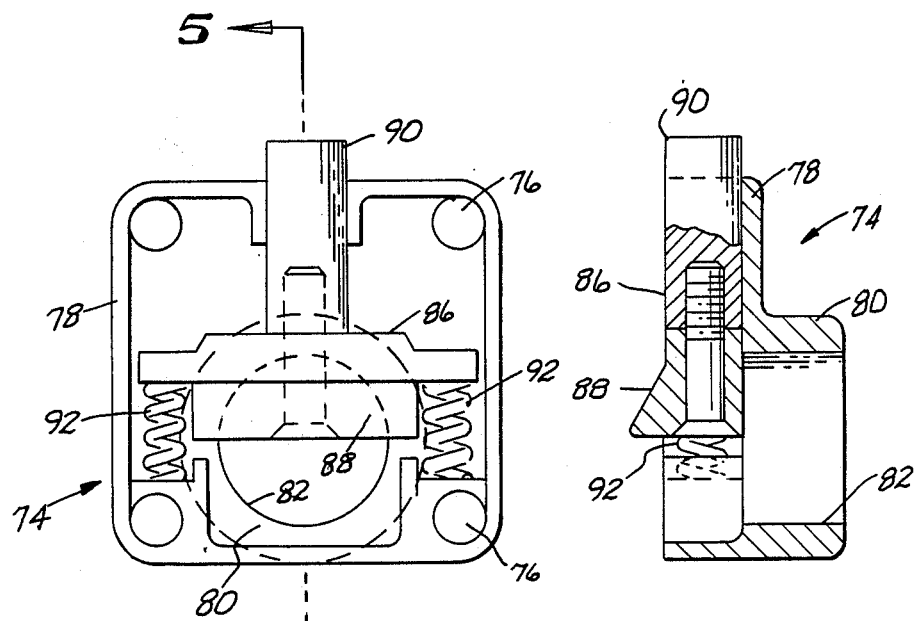
FIG. 4 is an end view of the keeper mechanism.
FIG. 5 is a cross-sectional side view taken along line 5—5 of FIG. 4.

A keeper assembly, generally designated 74, is associated with the second body where it is fixed by means of attachment points 76 as seen in FIG. 4. The keeper assembly 74 includes a keeper body 78. The keeper body 78 includes a barrel 80 having a bore 82 therethrough. The bore 82 is designed to receive and slidably support the latching bolt 34. The cooperation of the bore 22 on the latch body 14 and the bore 82 on the keeper body 78 provides the support for transmitting shear loads through the latching bolt 34.

Arranged in the latching bolt 34 at the head end thereof is a recess 84. The recess 84 includes a locking surface 85 arranged at a substantial angle to the longitudinal direction of the latching bolt 34. In the embodiment of FIG. 1, the locking surface 85 is undercut into the latching bolt at one side of the recess 84.

Forming part of the keeper assembly 74 is a keeper 86. The keeper 86 is slidably arranged in the keeper body 78 such that it may extend down into the bore 82 to engage with the bolt 34 at the recess 84. The keeper 86 illustrated in FIG. 1 is shown to have a locking surface 88 which mates with the locking surface 85 on the latching bolt 34. The undercut nature of the recess 84 at the locking surface 85 and the mating arrangement of the locking surface 88 on the keeper 86 acts to prevent retraction of the keeper 86 when the latching bolt 34 is locked in a tensioned condition.

The keeper 86 includes a flag 90 which is shown to protrude from the upper surface of the main body when the keeper 86 is not engaged with the latching bolt 34. The flag extending upwardly indicates that the latch is not in the secured configuration.

As can be seen in FIGS. 1-3, the keeper 86 is slidable from an engagement position wherein the locking surface 88 is mated with the locking surface 85, to a retracted position wherein the locking surface 88 does not extend into the recess 84 and cannot engage the latching bolt 34.

The keeper assembly 74 also includes springs 92 which provide means for biasing the keeper 86 from engagement with the latching bolt 34. Thus, in the embodiment of FIG. 1, the bolt 34 is not engaged with the keeper 86 until such time as the springs 92 are overcome and the keeper is forced into the recess 84 with the latching bolt 34 in the appropriate position. Thus, in this embodiment, the operator provides the means for overcoming the springs 92 to engage the keeper 86 with the latching bolt 34.

With reference to the embodiment as illustrated in FIGS. 1 through 8, the operation of the latch mechanism disclosed herein will now be described. FIG. 1 illustrates in solid line the latch mechanism in the latched position. As can be seen, the locking surface 88 on the keeper 86 engages the locking surface 85 on the latching bolt 34. In the locked condition, the first link 48 and the second link 50 are arranged overcenter such that the two links form an obtuse angle toward the lever 64. The adjusting shaft 38 is set such that the links 48 and 50 are in compression. Consequently, the latch body 18 holds the links 48 and 50 in compression which in turn act against the pin 44 to stress the pin toward the right as seen in FIG. 1. This places the latching bolt 34 in tension. The latching bolt 34 then acts as a tension latching mechanism in conjunction with the interlocked keeper 86. The lever 64 is also held in a flush condition with the first body 12 by means of the locking member 70. The hook 72 thereof is held in place by the pin 44. In this locked and closed position, the pin 44 is located at one end of the slot 54, the end closest to the anchoring pin 46 fixed to the latch body 18. Thus, the linkage between the anchor point at the pin 46 and the trunnion 42 is at its minimum while in the extended position.

To open the latch from the locked condition described above, the latch release is pivoted by depressing one end thereof lying in the upper plane of the lever 64. This rotates the locking member 70 to unhook the hook 72 from the pin 44. The spring 60 or other convenient biasing means then acts to lift the lever 64 such that it may be manually gripped to function as a handle. The lever 64 is able to rotate upwardly to a certain extend without affecting the overcenter condition of the links 48 and 50 because of the slot 68. With the lever 64 slightly raised, access is available to the adjusting shaft 38 for adjustment with the latch under load. Once the lever 64 has been raised to the point where the slot 68 encounters the pin 52, the lever 64 may be gripped and rotated upwardly and toward the keeper assembly. This rotates the linkage defined by the links 48 and 50 through a center position such that the angle between the links 48 and 50 then becomes obtuse on the bottom side of the links. As the lever 64 continues to rotate, tension is released on the latching bolt 34; but the bolt is not drawn in either direction because the second link 50 is being drawn such that the pin 44 rides in the slot 54 to the end most distant from the anchoring pin 46. Once the link 50 progresses through rotation of the lever 64 to the point where the distant end of the slot 54 is reached, the spring 60 rotates the link 50 upwardly such that the pin 44 comes to reside in the lateral notch 56. Continued rotation of the lever 64 then draws the latching bolt 34 further toward the keeper assembly 74. As the latching bolt 34 is drawn in that direction, the locking surfaces 85 and 88 disengage and the keeper 86 moves upwardly under the influence of the springs 92. With the lever 64 fully rotated toward the keeper assembly, the keeper 86 is sure to be released from the latching bolt 34.

To continue the unlatching process, the lever 64 is then moved downwardly back toward the closed position. With the keeper 86 retracted, the latching bolt 34 is free to be withdrawn from the keeper assembly 74. The linkage is now arranged with the pin 44 located in the lateral notch 56. As the lever 64 is moved toward the right, as seen in FIG. 2, the pin 44 abuts up against the shoulder 58 of the lateral notch 56 to drive the latching bolt 34 away from the keeper assembly 74. In this condition, the linkage has its effective full length when extended because the shoulder 58, located intermediate the ends of the slot 54 retains the pin 44 at the end of the slot most distant from the anchoring pin 46.

With full rotation of the lever 64, the latching bolt 34 is fully extracted from the keeper assembly 74 as can be seen in phantom in FIG. 2.

In the unlatched condition, the lever 64 may be rotated toward the closed position. However, the keeper flag 90 extends from the second body 14 to indicate an unlocked condition. The lever 64 may also be arranged such that the locking member 70 interferes with the pin 44 and cannot be fully closed.

To latch the mechanism, assuming that the latching bolt 34 is in its fully retracted position as shown in phantom in FIG. 2, the lever 64 is rotated upwardly and toward the keeper assembly 74. The pin 44 remains at the distant end of the slot 54. With full rotation of the lever 64 toward the keeper assembly 74, the latching bolt 34 comes to a fully extended position as seen in full line in FIG. 2. The lever 64 may then be rotated toward the right while the keeper 86 is pushed downwardly against the latching bolt 34 against the force of the springs 92. When the latching bolt 34 moves to where the recess 84 is aligned with the keeper 86, the keeper drops into place; and further rotation of the lever 64 in the same direction brings into mating relationship the locking surfaces 85 and 88. The lever 64 is then prevented from rotating further until the second link 50 is manually depressed to disengage the pin 44 from the lateral notch 56. Once disengaged, the second link 50 moves relative to the pin 44 along the slot 54. Once the pin 44 comes to the end of the slot 54 closest to the anchoring pin 46, the linkage forces the pin 44 and the associated latching bolt 34 toward the right. As the latching bolt 34 is already engaged with the keeper 86, further movement of the latching bolt 34 away from the keeper assembly 74 is prevented. With proper adjustment, the latching bolt 34 is then appropriately tensioned as the links 48 and 50 proceed overcenter to the locked condition. Further movement of the lever 64 then engages the hook 72 over the pin 44 to retain the lever 64 in the fully closed position.

Figure 9:
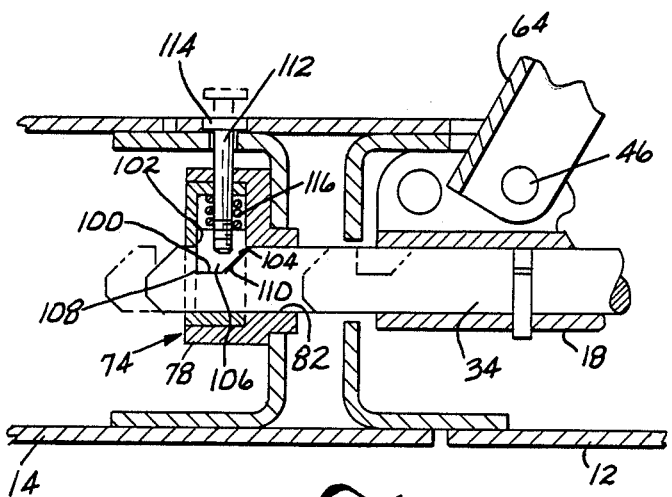
FIG. 9 is a detail side view taken in cross section of a second keeper embodiment of the present invention.
Figure 10:
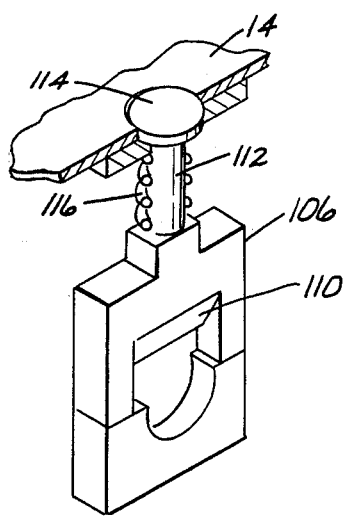
FIG. 10 is an oblique view of the keeper of FIG. 9.

FIGS. 9 and 10 illustrate a keeper/bolt arrangement wherein the latching bolt 34 includes a differently-configured recess and the keeper assembly is substantially altered. The bolt recess 100 has a locking surface 102 which is presented at a substantial angle to the longitudinal direction of the latching bolt 34. In this embodiment, the locking surface 102 is perpendicular to the longitudinal direction. Also included in the recess 100 is an inclined surface 104. The inclined surface is opposite to the locking surface 102 in the recess 100.

A keeper assembly 74 is provided which includes a keeper body 78 providing a bore 82 for receipt of the latching bolt 34. A keeper 106 is slidably retained within the keeper body 78. The keeper 106 includes a first interlocking surface 108 which mates with the locking surface 102. An inclined surface 110 on the keeper 106 on an opposite side to the locking surface 108 mates with the inclined surface 104 on the latching bolt 34. The keeper is fully illustrated in the oblique view of FIG. 10. A flag 112 is fixed to the top of the keeper and extends upwardly to the surface of the second body 14. In this embodiment, the flag is shown to have a head 114 which fits within a recess in the upper surface of the second body 14. A spring 116 biases the keeper 106 downwardly into engagement with the latching bolt 34. This retains the flat 112 flush with the second body 14 unless the latching bolt 34 is positioned in the bore 82 without being aligned with the keeper 106. The position of the head under such a condition when the keeper 106 is not aligned with the bolt recess 100 is illustrated in phantom in FIG. 9.

In operation, the embodiment of FIGS. 9 and 10 contemplate the use of the lever and linkage mechanism of the first embodiment. Thus, the latching bolt 34 may be positioned in any of the three positions illustrated in full and phantom lines in FIG. 9. When starting in the locked condition, the latching bolt 34 may be advanced further into the keeper assembly 74. This causes the inclined surfaces 104 and 110 to drive the keeper 106 upwardly from the bolt recess 100 against the biasing force of the spring 116. Once the latching bolt 34 is brought forward, manual purchase of the head 114 of the keeper flag 112 may be achieved such that the latching bolt 34 may be fully withdrawn from the keeper assembly 74. For engagement, the latching bolt 34 is driven forward through the bore 82 of the keeper body 78. A leading inclined surface 118 cooperates with the keeper inclined surface 110 to initially raise the keeper 106 into the recess 100. If the latching bolt 34 extends too far, it may simply be brought back into position without further manipulation of the keeper 106.

Figure 11:
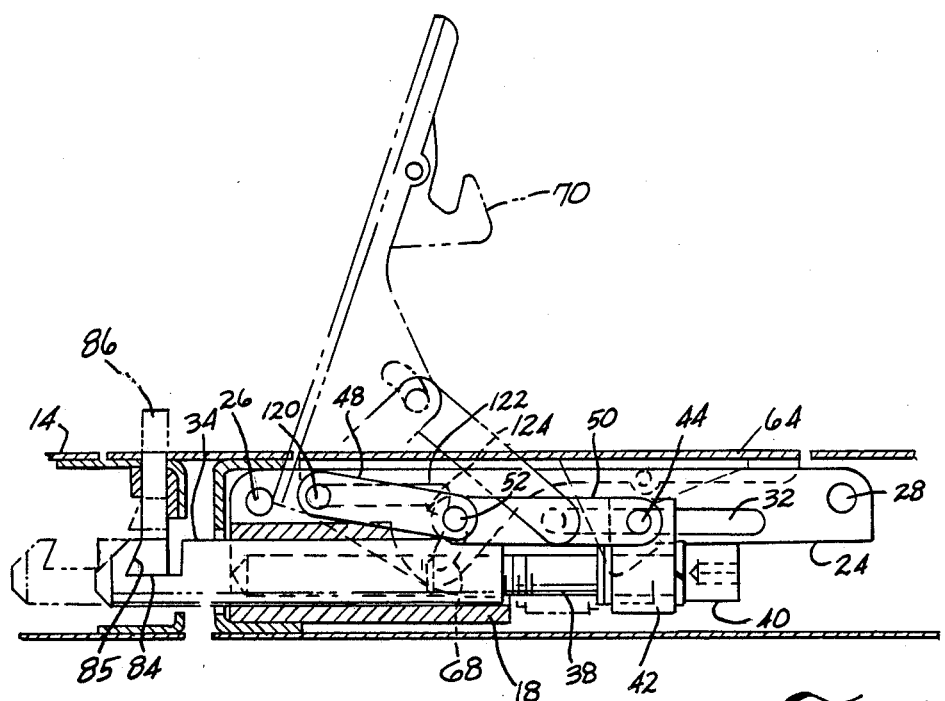
FIG. 11 is a cross-sectional side view of a third embodiment of the present invention showing the same positions in full and phantom as in FIG. 1.
Figure 12:
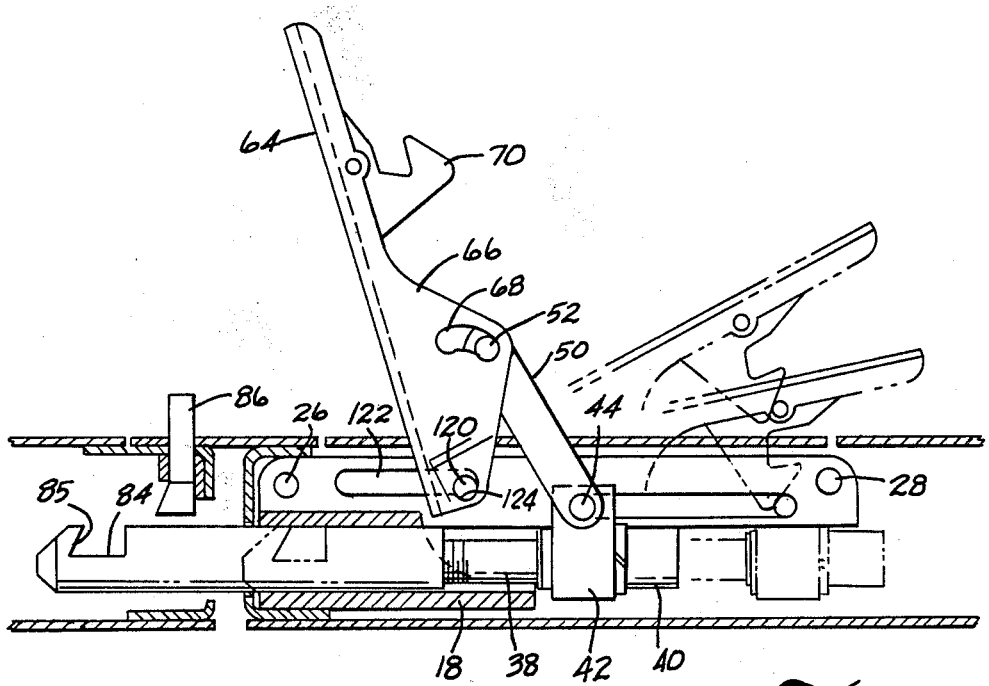
FIG. 12 is a cross-sectional side view of the latch mechanism of FIG. 11 illustrating the latching bolt fully extended in full line and fully retracted in phantom.
Figure 13:
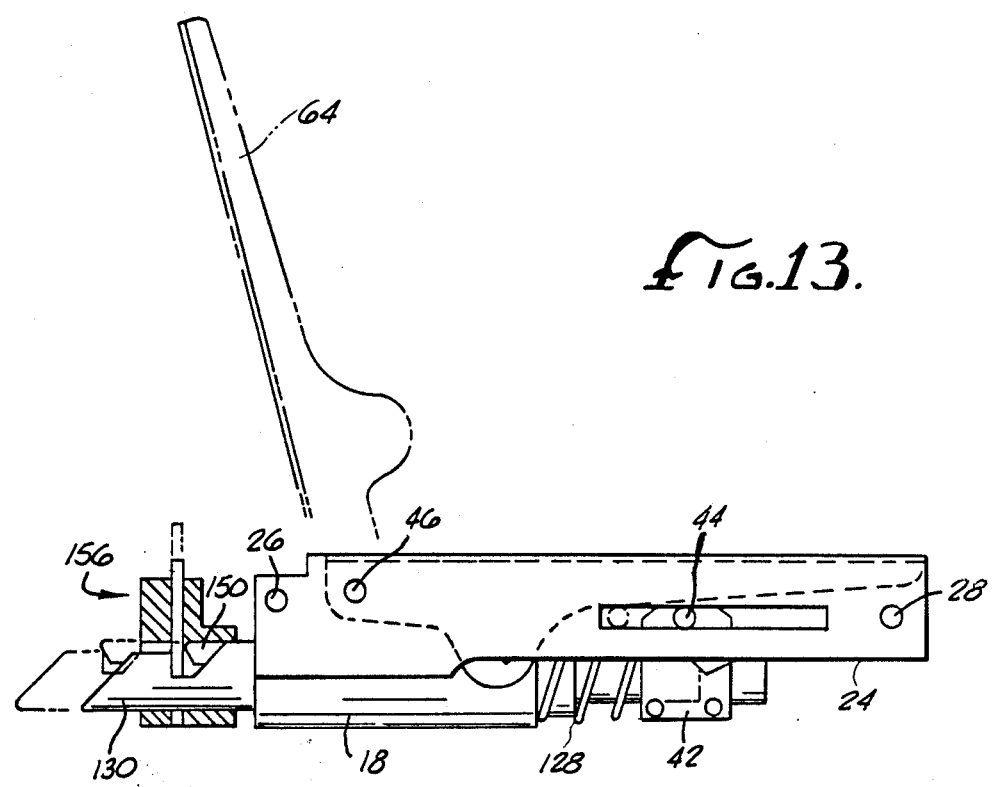
FIG. 13 is a side view of yet another latch assembly and keeper with the locked position illustrated in full line and the unlatching position with the bolt fully extended in phantom.
Figure 14:
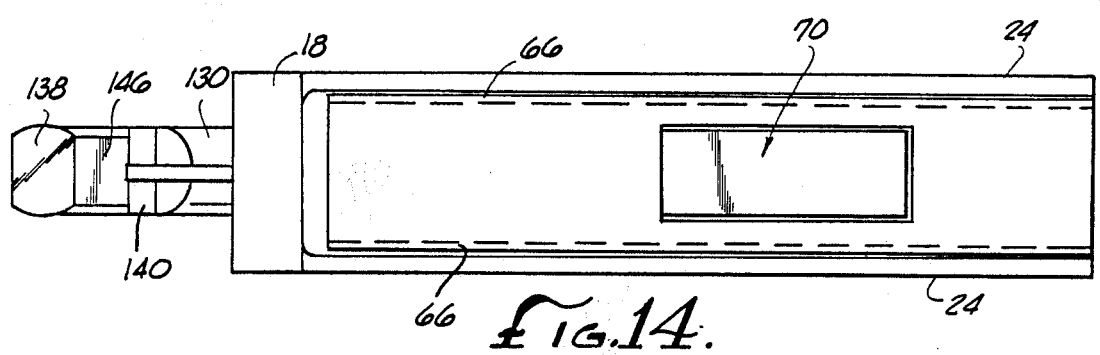
FIG. 14 is a plan view of the latch assembly of FIG. 13.
Figure 15:
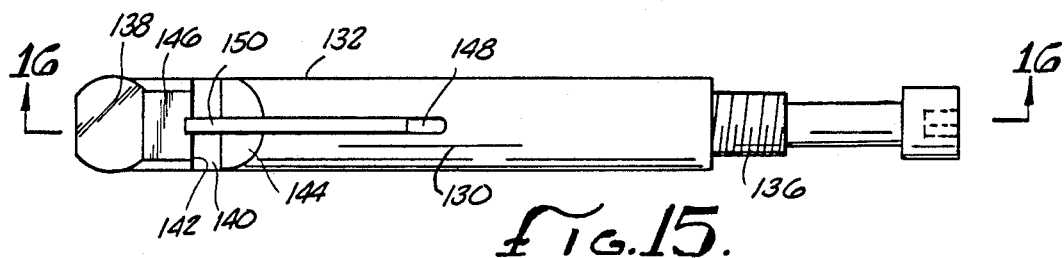
FIG. 15 is a plan view of the modified latching bolt of FIG. 13.
Figure 16:
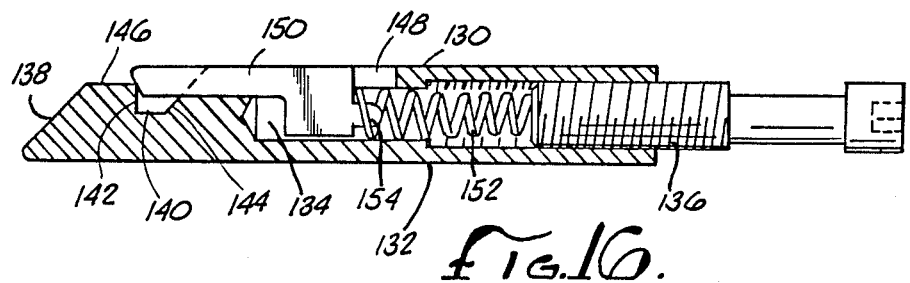
FIG. 16 is a cross-sectional side view taken along line 16—16 of FIG. 15.

A further embodiment is illustrated in FIGS. 11 and 12. This embodiment is designed to illustrate a variation on the linkage mechanism between the latch body and the latching bolt through an alternate placement of the active slot and pin mechanism. In this instance, the second link 50 does not include a slot therein but is directly pinned to the trunnion pin 44. Instead, a pin 120 is provided in the lever 64 which cooperates with a slot 122 located in the latch body 18. The slot 122 forming part of the linkage mechanism has a lateral notch 124 at the end thereof which is closest to the trunnion 42. Again, a shoulder is provided on one side of the lateral notch 124 to provide a surface intermediate the ends of the slot 122 against which the pin 120 may be positioned.

In operation, the embodiment of FIGS. 11 and 12 work substantially as that of the first embodiment but for the action of the lever 64. The locked position is illustrated in FIG. 11 with the position by which full locking can occur illustrated in the same Figure in phantom. In that position, the pin 120 associated with the lever 64 is found at the end of the slot 122 closest to the keeper assembly. In FIG. 12, the lever 64 is arranged for retraction of the latching bolt 34. In this arrangement, the pin 120 is moved to the lateral notch 124 such that it can be positioned against the shoulder therein to retract the latching bolt 34 completely from the keeper assembly 74.

A further mechanism is illustrated in FIGS. 13 through 18 which additionally incorporates subject matter resulting from the efforts of another but which is contemplated to be a preferred design, at least for automatic latch operation. The latch assembly, but for the features of the bolt and the addition of a return spring, are substantially identical to the embodiments described above and reference is made to that description. A return spring 128 is positioned between the trunnion 42 and the latch body 18 to bias the entire latching bolt 34 toward the unlatched position.

The latching bolt can be seen to be a further modification to the device of FIG. 9. A latching bolt 130 includes a bolt head 132 having a central bore 134 therein. The central bore 134 is threaded to receive a threaded adjusting shaft 136 configured as in the embodiments described above. The bolt head 132 includes at its leading end an inclined or beveled surface 138. A recess 140 is located rearwardly of the beveled surface 138. The recess 140 includes a locking surface 142 substantially perpendicular to the longitudinal direction of the latching bolt 130. In this case, the locking surface 142 is perpendicular thereto. The recess 140 further includes an inclined surface 144 opposite to the locking surface 142 in the recess 140. Extending between the beveled surface 138 and the locking surface 142 is a step 146. The step 146 is cut into the main cross sectional dimension of the bolt head 132 such that the uppermost surface of the step 146 is lower than the uppermost surface of the bolt head 132 rearwardly of the inclined surface or ramp 144.

Disposed longitudinally in the bolt head 132 is a slot 148 which is cut through the inclined surface 144 rearwardly to a point in full communication with the bore 134. Located in the slot 148 is a slide member 150 which extends forwardly to abut against the locking surface 142. The slide member 150 extends rearwardly and downwardly into the bore 134 in the bolt head 132 as can best be seen in FIG. 15. Located within the bore 134 is a compression spring 152. The spring extends between the end of the adjusting shaft 136 and the back end of the slide member 150. A protrusion 154 on the slide member 150 orients the spring 152 relative to the slide member 150. The spring 152 biases the slide member 150 against the locking surface 142. Sufficient room is provided in the slot 148 to allow the slide member 150 to be retracted in the longitudinal direction of the latching bolt 130 such that the front end of the slide member 150 does not protrude from the inclined surface 144 to any significant extent when in the retracted position.

A keeper assembly is employed to provide tension and shear resistance to movement of the latching assembly. The keeper assembly in the embodiment of FIGS. 13 through 18 is much like that of FIGS. 9 and 10. In fact, it is considered that the keeper assemblies of the two embodiments may have some interchangeable uses. If the keeper assembly of FIGS. 9 and 10 were to be employed in the embodiment of FIGS. 13 through 18, the spring 116 would have to be effectively stronger than the spring 152 in order that the keeper 106 would not ride up over the slide member 150. To avoid that consideration, a flat keeper 156 is shown to be employed with the embodiment of FIGS. 13 through 18.

The keeper 156 is slidably positioned in a keeper body 158 to slide into and out of engagement with the recess 140. A bore 160 is provided in the keeper body 158 to resist shear loads. A pin 162 helps guide and limit the movement of the keeper 156 through engagement with a small slot 164. The keeper 156 extends upwardly in a flag 166 to extend outwardly from the upper surface of the keeper body 158. Springs 168 bias the keeper 156 toward engagement with the latching bolt 130 through flanges 157.

Looking to the operation of the embodiment of FIGS. 13 through 18, the same linkage and lever operation is contemplated as with the embodiments described above. Consequently, the latching bolt 130 may be advanced into the bore 160 of the keeper body 158 to and beyond the latched position as well as fully retracted from the keeper body 158. Starting from the locked position, the keeper 156 is extended into the recess 140 where it is biased by the springs 168. The slide member 150 is slid away from the locking surface 142 to make room for the keeper 156. Unlatching the bolt 130 is accomplished by drawing the lever 64 upwardly and toward the keeper assembly. This causes the latching bolt 130 to advance further into the keeper body 158. This motion causes the keeper 156 to ride up on the inclined surface 144 and to force the slide member 150 further into the slot 148. When the keeper 156 reaches the top of the inclined surface 144, the slide member 150 falls beneath the keeper 156 and is biased by the spring 152 outwardly against the locking surface 142. The advancement of the lever 64 also brought the pin 44, referenced in FIG. 1, to reside in the lateral notch 56. At this time, the lever 64 may be rotated back down into or toward the closed position. This in turn withdraws the latching bolt 130 from the bore 160 of the keeper body 158. As the latching bolt 130 is retracted, the keeper 156 is prevented from reentering the recess 140 because of the repositioned slide member 150.

As the latching bolt 130 is positioned for latching of the mechanism, it is advanced until the keeper 156 falls into the recess 140. To do so, the keeper pushes the slide member 150 rearwardly. The locking of the mechanism is recognized by the disappearance of the flag 166 as the keeper 156 drops into the recess 140. The latching assembly may then be returned to the locked position as described with regard to the foregoing embodiments.

Accodingly, improved latching mechanisms are disclosed useful for latching in both tension and shear. While embodiments and applications of this invention have been shown and described, it would be apparent to those of ordinary skill in the art that many more modifications are possible without departing from the inventive concepts herein. Thus, the invention is not to be limited except in the spirit of the appended claims.

What is claimed is:

1. A mechanism for latching a first body to a second body, comprising
    a latch assembly including a latch body fixedly attachable to a first body, a latching bolt slidably mounted in said latch body to slide in the longitudinal direction of said latching bolt, a first link, a second link, a first pin coupling said first link and said latch body, a second pin coupling said first and second links, a third pin coupling said second link and said latching bolt, and a slot for receiving one of said first, second and third pins, said slot being in one of said latch body, said first link, said second link and said latching bolt and including a first and a second pin position for said associated pin, each pin position providing a linkage length, said first pin position comprising a lateral notch providing a shoulder intermediate the ends of said slot to selectively receive and restrain said associated pin, said first and second links pivoting about said second pin to extend and retract said latching bolt with said associated pin in a pin position; and
    a keeper assembly fixedly attachable to a second body to receive said latching bolt.

2. The mechanism of claim 1 wherein said latching bolt includes a locking surface at a substantial angle to the longitudinal direction of said latching bolt, said keeper assembly including a keeper body having a bore to slidably receive said latching bolt and a keeper movably mounted in said keeper body and extendable to interlock with said locking surface of said latching bolt.

3. A mechanism for latching a first body to a second body, comprising
    a latch assembly including a latch body fixedly attachable to a first body, a latching bolt slidably mounted in said latch body to slide in the longitudinal direction of said latching bolt, a first link, a second link, a first pin coupling said first link and said latch body, a second pin coupling said first and second links, a third pin coupling said second link and said latching bolt, and a slot for receiving one of said first, second and third pins, said slot being in one of said latch body, said first link, said second link and said latching bolt and including a lateral notch providing a shoulder intermediate the ends of said slot to selectively receive and restrain said associated pin; and
    a keeper assembly to receive said latching bolt, wherein said slot is located in said second link to cooperate with said third pin, said notch being at the end of said slot most distant from said second pin.

4. The mechanism of claim 1 wherein said slot is in said latch body to cooperate with said first pin, said notch being at the end of said slot toward said third pin.

5. A mechanism for latching a first body to a second body, comprising
    a latch assembly including a latch body fixedly attachable to a first body, a latching bolt slidably mounted in said latch body to slide in the longitudinal direction of said latching bolt, a first link, a second link, a first pin coupling said first link and said latch body, a second pin coupling said first and second links, a third pin coupling said second link and said latching bolt, and a slot for receiving one of said first, second and third pins, said slot being in one of said latch body, said first link, said second link and said latching bolt and including a lateral notch providing a shoulder intermediate the ends of said slot to selectively receive and restrain said associated pin;
    a keeper assembly to receive said latching bolt, and
    a lever pivotally mounted at said first pin, said lever extending to and receiving said second pin for controlling relative angular movement between said first and second links.

6. A mechanism for latching a first body to a second body, comprising
    a latch assembly including a latch body fixedly attachable to a first body, a latching bolt slidably mounted in said latch body to slide in the longitudinal direction of said latching bolt, a first link, a second link, a first pin coupling said first link and said latch body, a second pin coupling said first and second links, a third pin coupling said second link and said latching bolt, and a slot for receiving one of said first, second and third pins, said slot being in one of said latch body, said first link, said second link and said latching bolt and including a lateral notch providing a shoulder intermediate the ends of said slot to selectively receive and restrain said associated pin; and
    a keeper assembly to receive said latching bolt, wherein said locking bolt includes a mounting for receipt of said third pin, said mounting being adjustable longitudinally on said latching bolt.

7. The mechanism of claim 1 wherein said first link and said second link define an overcenter link mechanism.

8. A mechanism for latching a first body to a second body, comprising
    a latch assembly including a latch body fixedly attachable to a first body, a latching bolt slidably mounted in said latch body to slide in the longitudinal direction of said latching bolt and having a locking surface at a substantial angle to the longitudinal direction of said bolt, and an adjustable linkage having a first link coupled by a first pin to said latch body and a second link coupled by a second pin to said first link and by a third pin to said latching bolt, said first link and said second link pivoting about said second pin to extend and retract said latching bolt, and means for selecting at least two different linkage lengths independent of the pivoting of said first and second links; and a keeper assembly fixedly attachable to a second body to receive said latching bolt and said locking surface, said keeper assembly including a keeper body having a bore to slidably receive said latching bolt and a keeper movably mounted in said keeper body and extending to interlock with said locking surface of said latching bolt.

9. The mechanism of claim 8 wherein said keeper is slidably mounted in said keeper body to extend into the path of travel of said latching bolt.

10. The mechanism of claim 8 wherein said locking surface is undercut into said latching bolt and said keeper includes an inclined surface mating with said locking surface, said keeper being spring biased away from said locking bolt.

11. The mechanism of claim 10 wherein said keeper includes a flag portion extending outwardly from the second body when said keeper is not engaged with said locking surface.

12. The mechanism of claim 10 wherein said keeper is resiliently biased toward disengagement with said latching bolt.

13. The mechanism of claim 8 wherein said latching bolt includes a first inclined surface on a side opposite the locking surface, said first inclined surface being inclined relative to the longitudinal direction of said locking bolt and said keeper includes a second inclined surface relative to the path of movement of said keeper, said first and second inclined surfaces fitting together with said keeper engage with said locking surface, axial movement of said latching bolt causing disengagement of said keeper member from said latching bolt by relative movement of said first inclined surfaces.

14. The mechanism of claim 13 wherein said keeper is resiliently biased toward engagement with said latching bolt.

15. A latching mechanism for latching a first body to a second body, comprising a latch assembly including
   a latch body fixedly attachable to a first body,
   a latching bolt slidably mounted in said latch body to slide in a longitudinal direction of said latching bolt,
   a first link,
   a second link,
   a first pin coupling said first link and said latch body,
   a second pin coupling said first and second links,
   a third pin coupling said second link and said latching bolt, and
   a slot in said second link for receiving said third pin and including a lateral notch having a shoulder intermediate the ends of said slot to selectively receive and restrain said third pin; and
   a keeper assembly fixedly attachable to a second body for receiving said latching bolt,
   wherein said latching bolt is slidably extendable from said latch body between an extended and a retracted position upon pivoting of said first link while said third pin is in a single position within said slot, said latching bolt including a locking surface at an angle to the longitudinal direction of said latching bolt, said keeper assembly having a bore to slidably receive said latching bolt and a keeper movably mounted in said keeper body and extendable to interlock with said locking surface of said latching bolt when said latching bolt is in the extended position.

16. The mechanism of claim 15 wherein said latching bolt is movable to the retracted position with said keeper interlocked with said latching bolt.

17. The mechanism of claim 15 wherein said first link includes a lever having a locking member which is lockable to said latch body when said latching bolt is in the retracted position.

* * * * *